US012582961B2

(12) United States Patent
Jeong et al.

(10) Patent No.: US 12,582,961 B2
(45) Date of Patent: Mar. 24, 2026

(54) DEVICE FOR PREPARING MULTI-COMPONENT METAL HYDROXIDE

(71) Applicant: L&F CO., LTD., Daegu (KR)

(72) Inventors: Hyun Do Jeong, Daegu (KR); Sung Kyun Chang, Daegu (KR); Sun Hong Park, Daegu (KR)

(73) Assignee: L&F CO., LTD., Daegu (KR)

( * ) Notice: Subject to any disclaimer, the term of this patent is extended or adjusted under 35 U.S.C. 154(b) by 503 days.

(21) Appl. No.: 18/008,497

(22) PCT Filed: Mar. 29, 2021

(86) PCT No.: PCT/KR2021/003821
§ 371 (c)(1),
(2) Date: Dec. 6, 2022

(87) PCT Pub. No.: WO2021/256672
PCT Pub. Date: Dec. 23, 2021

(65) Prior Publication Data
US 2023/0124497 A1    Apr. 20, 2023

(30) Foreign Application Priority Data

Jun. 15, 2020    (KR) ........................ 10-2020-0072590

(51) Int. Cl.
*B01J 19/00*      (2006.01)
*H01M 4/525*      (2010.01)
*H01M 10/0525*    (2010.01)

(52) U.S. Cl.
CPC ....... *B01J 19/0053* (2013.01); *B01J 19/0006* (2013.01); *H01M 4/525* (2013.01); *H01M 10/0525* (2013.01); *B01J 2204/002* (2013.01)

(58) Field of Classification Search
CPC .... H01M 4/525; H01M 10/0525; B01J 19/00; B01J 19/0006; B01J 19/0053
See application file for complete search history.

(56) References Cited

U.S. PATENT DOCUMENTS

2002/0053663 A1*    5/2002    Ito ........................... H01B 1/08
252/518.1

FOREIGN PATENT DOCUMENTS

EP         0353837        7/1994
KR     10-2005-0073456    7/2005
(Continued)

*Primary Examiner* — Karie O'Neill Apicella
(74) *Attorney, Agent, or Firm* — LEX IP MEISTER, PLLC

(57) ABSTRACT

Disclosed is a device for preparing multi-component metal hydroxide including a raw material feeder configured to feed raw materials including a metal raw material, a pH adjuster and a complexing agent, a reactor configured to react the raw materials fed from the raw material feeder to prepare a reaction solution and grow particles of multi-component metal hydroxide contained in the reaction solution, a storage tank configured to store the reaction solution transferred from the reactor, a first duct configured to transfer the raw materials from the raw material feeder to the reactor, a second duct configured to transfer the reaction solution from the reactor to the storage tank, a third duct configured to transfer the reaction solution from the storage tank to the reactor, and an operation controller configured to control operations of the reactor and the storage tank to circulate the reaction solution between the reactor and the storage tank until the particles of multi-component metal hydroxide grow to a target particle size.

18 Claims, 3 Drawing Sheets

(56)                         References Cited

FOREIGN PATENT DOCUMENTS

| KR | 20050073456 A | * | 7/2005 | ............. H01M 4/52 |
| KR | 10-1405663 | | 6/2014 | |
| KR | 10-2017-0046921 | | 5/2017 | |
| KR | 10-2019-0002179 | | 1/2019 | |

* cited by examiner

【FIG. 1】
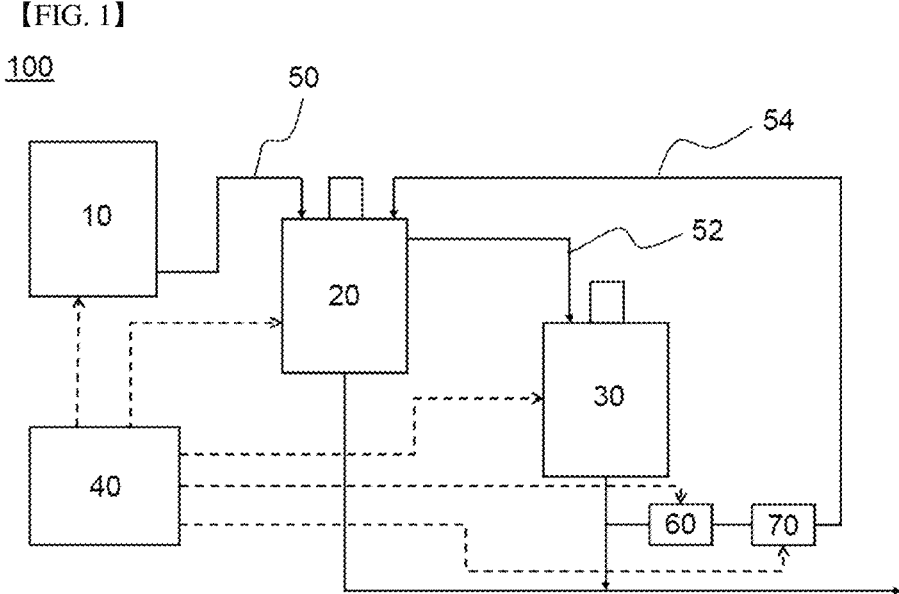
【FIG. 2】
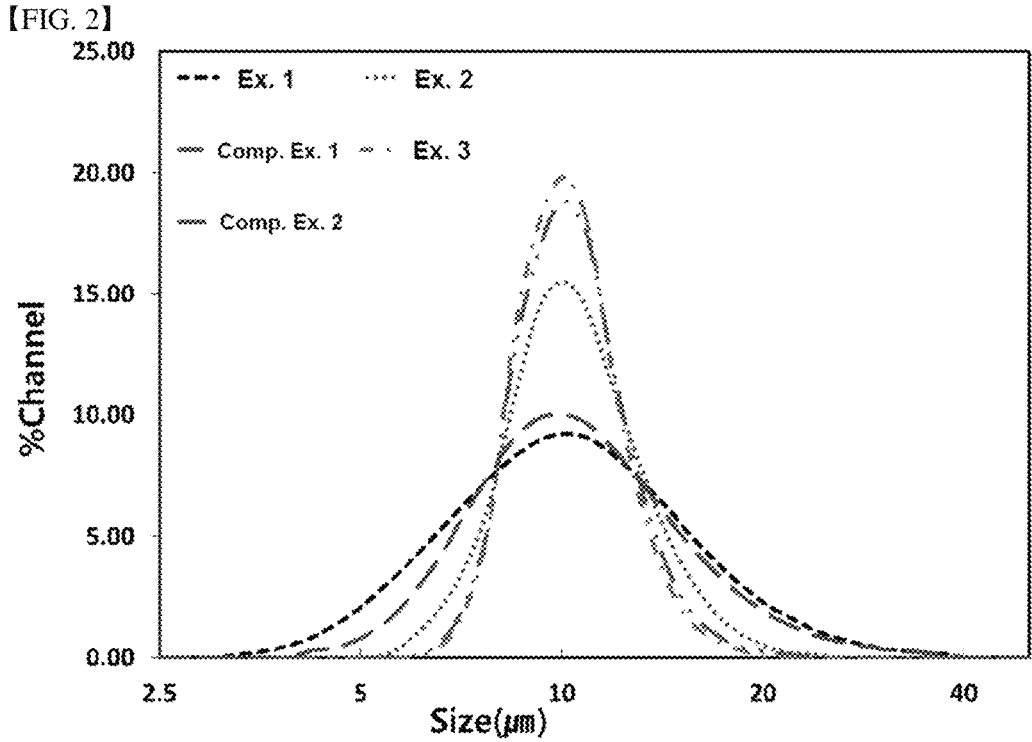

【FIG. 3a】
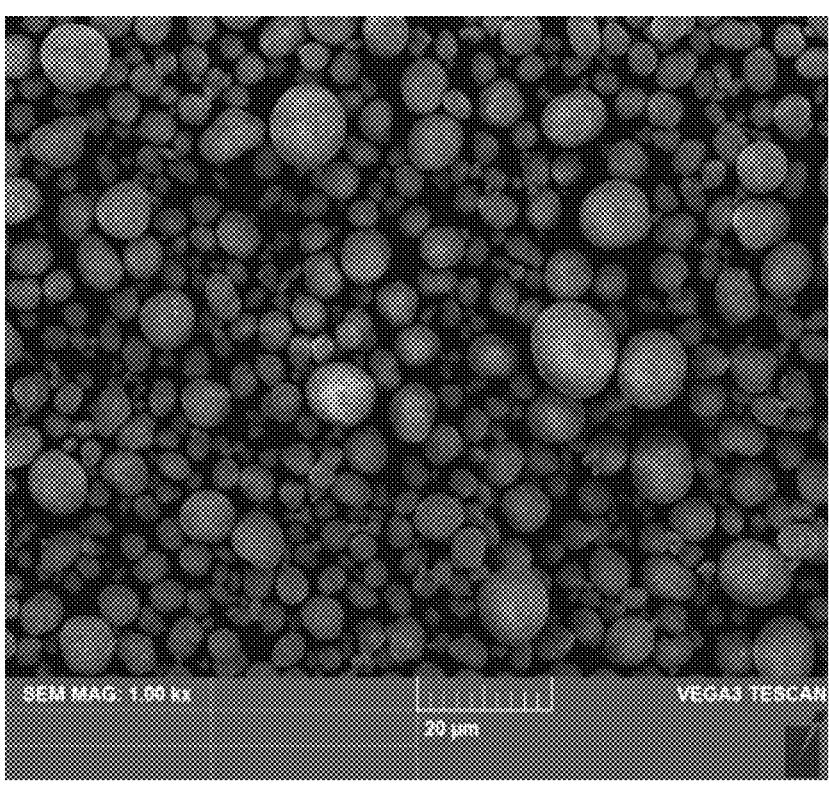

【FIG. 3b】
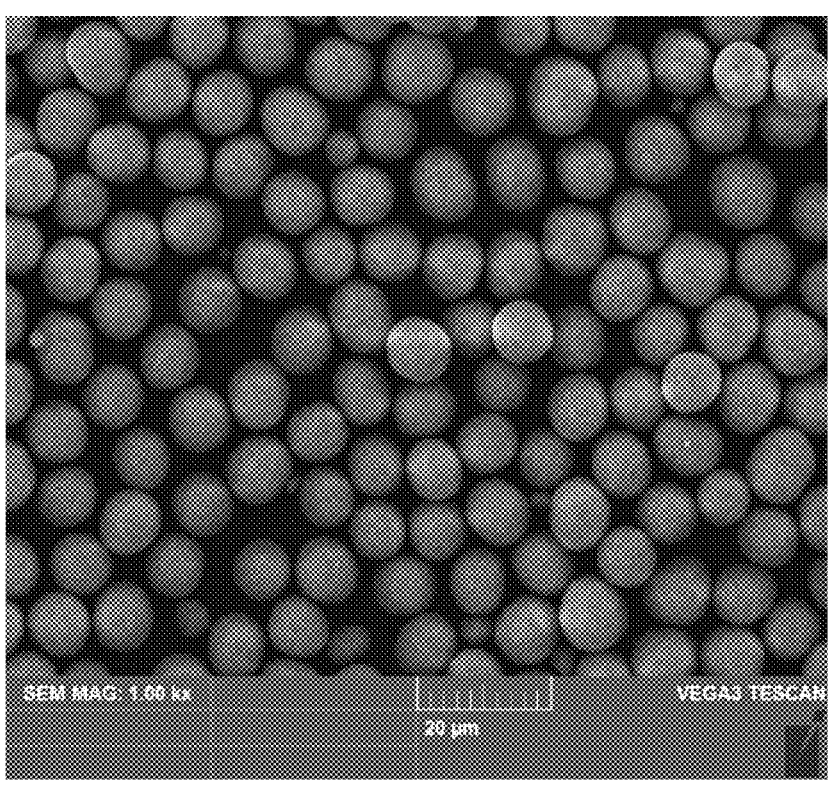

DEVICE FOR PREPARING MULTI-COMPONENT METAL HYDROXIDE

TECHNICAL FIELD

The present invention relates to a device for preparing multi-component metal hydroxides, a method for preparing multi-component metal hydroxides using the same, and metal precursor powders prepared using the same.

BACKGROUND ART

Lithium secondary batteries are mainly used for digital devices such as laptops and mobile phones and lithium secondary batteries are finding ever expanding applications from portable information and communication devices to electric vehicles, hybrid automobiles, aerospace, and energy storage systems (ESS) based on cost reduction and performance stabilization through mass production and technological development and the market for lithium secondary batteries is expected to continue to grow.

The core materials of lithium secondary batteries are a cathode active material, an anode active material, an electrolyte, and a separator. Thereamong, the cathode active material is the most core material for manufacturing secondary batteries and is divided into lithium cobalt oxide (LCO), lithium nickel cobalt manganese oxide (NCM), lithium nickel cobalt aluminum oxide (NCA), lithium manganese oxide (LMO), lithium iron phosphate (LFP), and the like, depending on constituent materials thereof.

Recently, there is an increasing demand for high-capacity and high-density cathode active materials to improve the performance of lithium secondary batteries. For this purpose, an active material that has an improved mixture density by blending a plurality of different types of cathode active materials in, for example, a bimodal or trimodal form is suggested.

However, a plurality of types of active materials having different particle sizes should be separately calcined and then mixed in order to prepare the blended cathode active material. Therefore, there are problems in that the process cost increases and productivity decreases compared to the cost.

Accordingly, a co-sintering method in which a plurality of types of precursors are mixed in a specific ratio in a precursor step and simultaneously fired, instead of blending the cathode active materials, has been proposed. In such a method, it is important to satisfy the requirements to make the diffusion of Li constant by controlling the powder properties of the precursor particles for each size. Thereamong, controlling the distribution of the precursor is one of the most important factors.

As described above, control of the properties of the precursor is an important factor in order to improve the properties of the cathode active material. Since the properties of cathode active materials strongly reflect the properties of the precursor, the precursor may require properties similar to those of the cathode active material.

Meanwhile, representative methods for preparing precursors include a method based on a continuous stirred-tank reactor (CSTR), which simultaneously performs feeding and co-precipitation of raw materials and discharge of precursors formed as particles, and a batch-type method in which raw materials are fed and reacted in a predetermined volume of the reactor for a given period of time and precursors are discharged after completion of the reaction.

The CSTR-based method has advantages in that it is easy to control the metal composition ratio and the mixture density is excellent due to wide particle distribution in terms of energy density. Since feed of raw materials and discharge of products are continuously performed at the same time, there may be differences in residence time and reaction time in the reactor between the precursors generated in the reactor. This may cause a problem in that even the size and composition of the generated particles are non-uniform.

In addition, when the reaction time is excessively long, the degree of completeness of the secondary particles increases and the amount of fines detached from the secondary particles increases. On the other hand, when the reaction time is excessively short, the degree of completeness of the primary particles decreases and the degree of formation from the primary particles to the secondary particles decreases, thus disadvantageously causing an increase in the amount of fines and decreases in sphericity and density.

As described above, the CSTR-based precursor preparation method exhibits excellent energy density due to high mixture density thereof, but has several problems such as deterioration of electrochemical properties due to the different thermodynamic energies of Li diffusion depending on the size of particles during firing. Therefore, in recent years, there is a tendency to adopt a batch-type method for preparing a precursor that is capable of easily controlling the particle size (particle diameter) and is advantageous in preparing a precursor having a uniform particle size.

However, the batch-type precursor preparation method has various problems. More specifically, since raw materials should be continuously fed and stirred in order to form or grow precursors in a batch-type reactor, in order to form small metal particles (crystal nuclei) and grow the metal particles, the raw materials should be continuously fed. In this process, a problem may occur that the reactor is saturated before metal particles grow to target levels (size, shape, density and the like).

When the reactor is saturated, the feed of raw materials to grow metal particles should be stopped to terminate the reaction, or a part of the intermediate reactant should be discharged from the reactor to secure an area where raw materials are fed. The discharged intermediate reactant should be used for other applications or discarded, which may lead to problems with reduced productivity.

In the batch-type co-precipitation process, the volume of the reactor may be increased to prevent saturation of the reactor. However, this may make it difficult to secure uniformity of the precursor and obtain an improvement in process efficiency due to the deteriorated production efficiency compared to the volume of the equipment.

Accordingly, there is an increasing need for a novel technology capable of solving these problems.

DISCLOSURE

Technical Problem

Therefore, the present invention has been made to solve the above and other technical problems that have yet to be solved.

Specifically, it is an object of the present invention to provide multi-component metal hydroxide that has a particle distribution controlled to a desired level while solving the problems of conventional general batch-type or CSTR-type co-precipitation processes by easily controlling particle distribution and BET of metal particles (multi-component metal hydroxide) included in the multi-component metal slurry using a preparation device having a novel configuration based on a combination of batch-type co-precipitation with reaction solution circulation.

Technical Solution

In accordance with an aspect of the present invention, provided is a device for preparing multi-component metal hydroxide including a raw material feeder for feeding raw materials including a metal raw material, a pH adjuster and a complexing agent, a reactor for reacting the raw materials fed from the raw material feeder to prepare a reaction solution and grow particles of the multi-component metal hydroxide contained in the reaction solution, a storage tank for storing the reaction solution transferred from the reactor, a first duct for transferring the raw materials from the raw material feeder to the reactor, a second duct for transferring the reaction solution from the reactor to the storage tank, a third duct for transferring the reaction solution from the storage tank to the reactor, and an operation controller for controlling operations of the reactor and the storage tank to circulate the reaction solution between the reactor and the storage tank until the particles of the multi-component metal hydroxide grow to a target particle size.

Such a preparation device is a device for preparing multi-component metal hydroxide based on a novel configuration that did not exist in the prior art. This preparation device is capable of preparing multi-component metal hydroxides to desired levels by easily controlling particle distribution, BET and the like without causing a decrease in productivity by circulating the reaction solution between the reactor and the storage tank until predetermined requirements are satisfied.

Among the "raw materials", the term "metal raw material" may be an oxide, hydroxide or salt containing an alkali metal, alkaline earth metal, transition metal, post-transition metal, metalloid, or non-metal, or a combination thereof. An aqueous solution in which the metal raw material is dissolved or dispersed in a solvent may be provided. As a non-limiting example, the metal raw material may include at least one of nickel, cobalt, or manganese.

The "pH adjuster" controls the pH of the reaction solution produced by the feed of the raw materials to control the formation or growth of particles of the multi-component metal hydroxide in the reaction solution. Any substance may be used as the pH adjuster so long as it is capable of performing this function. As a non-limiting example, the pH adjuster may include at least one of sodium hydroxide, potassium hydroxide or sodium carbonate.

For example, the multi-component metal hydroxide particles may be formed by adjusting the reaction solution to a basic pH atmosphere using the pH adjuster and the multi-component metal hydroxide particles may be set to grow in a lower pH atmosphere. In the process of circulation of the reaction solution between the reactor and the storage tank, the pH atmosphere may be set to be equal to or lower than that in the particle growth conditions.

The "complexing agent" controls the rate of crystal growth by controlling the reaction rate of the reaction solution. Any substance may be used as the complexing agent so long as it is capable of performing this function. As a non-limiting example, the complexing agent may include at least one of ammonium hydroxide, ammonium nitrate or ammonium sulfate.

In one specific embodiment, the operation controller may control the operation of the raw material feeder to continuously feed the raw materials to the reactor until the particles of the multi-component metal hydroxide contained in the reaction solution grow to a target particle size.

Here, there is no particular limitation as to the configuration and shape of the operation controller so long as it is capable of controlling the operation of the device for preparing multi-component metal hydroxide according to the present invention, such as circulating the reaction solution, by controlling the operation of the reactor and the storage tank. As a non-limiting example, the operation controller may be a control system based on a computer system, and manual or semi-manual control by a device operator may also fall within the scope of the operation controller.

The target particle diameter of the particles may vary depending on the intended application, for example, depending on the type and application of the cathode active material to be finally synthesized using the multi-component metal hydroxide prepared in the device of the present invention.

In one specific embodiment, the operation controller may control the operation of the reactor to start transferring the reaction solution from the reactor to the storage tank when at least one of the following requirements is satisfied:

(i) when the particles of the multi-component metal hydroxide grow to a size corresponding to 20% or more of the target particle size; and (ii) when the filling rate of the multi-component metal hydroxide in the reactor is 65% or more by volume.

In the above requirement (i), the reaction solution containing the multi-component metal hydroxide in which the particle size or shape, density, or the like does not reach the target level may be considered a kind of "intermediate reactant" and the reaction solution as such an intermediate reactant continuously circulates between the reactor and the storage tank.

For example, in the requirement (ii), when raw materials are continuously fed to the reactor to form and grow particles of the multi-component metal hydroxide, the water level in the reactor rises and when the water level rises to a specific height in the reactor or the filling rate of the reaction solution becomes higher than a predetermined level, if the reaction solution starts to be transferred to the storage tank, saturation of the reactor before the multi-component metal hydroxide grows to a target value (size, shape, density, and the like) can be prevented.

As the reaction solution is transferred to the storage tank in this way, for example, when 5% or more of the internal capacity of the storage tank is filled with the reaction solution, the operation controller controls operation of the storage tank to start retransferring the reaction solution from the storage tank to the reactor. A portion of the reaction solution as the intermediate reactant transferred to the storage tank is re-transferred to the reactor, and the circulation of the reaction solution as the intermediate reactant between the reactor and the storage tank continues to grow particles of multi-component metal hydroxides.

The circulation of the reaction solution as the intermediate reactant between the reactor and the storage tank may continue until the multi-component metal hydroxide grows to a target level (size, shape, density, or the like). When the multi-component metal hydroxide in the reactor and the storage tank grows to the target level, the reaction and circulation are terminated, and the final product, that is, the reaction solution containing the multi-component metal hydroxide grown to the target level may be discharged from the reactor and the storage tank. In addition, since the multi-component metal hydroxide has grown to a target level, there is no need to feed raw materials into the reactor.

Therefore, as a specific example, the operation controller may be set to stop the circulation of the reaction solution and the feed of the raw materials from the raw material feeder when the particles of the multi-component metal hydroxide contained in the reaction solution of the reactor and the storage tank grow to a target particle size or more.

When the circulation of the reaction solution between the reactor and the storage tank is stopped, the particle properties of the multi-component metal hydroxide contained in the reaction solution in the reactor may be identical or similar to those in the storage tank. For example, particles of the multi-component metal hydroxide in the reaction solution in the reactor and the storage tank may have the same average particle diameter or may have an average particle diameter deviation of 1% or less.

In some cases, when the multi-component metal hydroxide contained in the reaction solution in at least one of the reactor or the storage tank grows to a target particle size or more, the operation controller may be set to selectively discharge the reaction solution from the reactor and/or the storage tank.

In this case, the device according to the present invention may further include a collector for receiving the reaction solution discharged from at least one of the reactor or the storage tank.

In at least one of the reactor or the storage tank, for example, a stirrer for stirring the reaction solution filled therein is further provided, so that the overall uniformity of the reaction solution may be further increased.

In one specific embodiment, the third duct may be further equipped with a solid-liquid separator for concentrating the reaction solution transferred from the storage tank to the reactor and the solid-liquid separator may function to increase the concentration of the multi-component metal hydroxide contained in the reaction solution by removing a part of the filtrate of the reaction solution transferred from the storage tank to the reactor.

The circulation of the reaction solution between the reactor and the storage tank may be realized in various ways. For example, the second duct connects the reactor to the storage tank such that a step (height difference) is formed between the reactor and the storage tank. As a result, the reaction solution of the reactor is transferred to the storage tank via the second duct based on the potential energy caused by the height difference. A circulation pump to provide a driving force for re-transferring the reaction solution stored in the storage tank to the reactor may be provided in the third duct.

In this configuration, in connection with the transfer of the reaction solution from the reactor to the storage tank and the re-transfer of the reaction solution from the storage tank to the reactor, an on-off valve may be installed on the second duct and the third duct, respectively, to enable transfer and re-transfer to be determined by the operation controller and thereby control the flow rate, pressure, or the like during transfer and re-transfer.

In one specific embodiment, the device may further include an inert gas feeder for feeding inert gas to at least one of the reactor or the storage tank to reduce the generation of by-products and the possibility of inducing side reactions by maintaining an inert atmosphere. In some cases, the temperature of the reactor and the storage tank may be kept constant by the inert gas.

An example of the preparation device described above is shown in the schematic diagram of FIG. 1. That is, the preparation device 100 according to an embodiment of the present invention includes a raw material feeder 10, a reactor 20, a storage tank 30, an operation controller 40, a solid-liquid separator 60, and a circulation pump 70 and the like, and further includes a first duct 50 for connecting the raw material feeder 10 to the reactor 20, a second duct 52 and a third duct 54 for connecting the reactor 20 to the storage tank 30. The configuration and operation mechanism thereof have been described above.

The present invention also provides a method for preparing a multi-component metal hydroxide using the device, the method including (a) feeding raw materials from the raw material feeder to the reactor via the first duct, (b) preparing a reaction solution by reaction of the raw materials in the reactor and growing multi-component metal hydroxide particles contained in the reaction solution, (c) transferring a part of the reaction solution from the reactor to the storage tank under predetermined conditions, (d) retransferring a part of the reaction solution from the storage tank to the reactor under predetermined conditions, (e) repeating the above steps (c) and (d) to circulate the reaction solution between the reactor and the storage tank until multi-component metal hydroxide particles grow to a target particle size, and (f) stopping the feed of the raw materials and the circulation of the reaction solution and discharging the reaction solution from the reactor and the storage tank when the multi-component metal hydroxide particles grow beyond the target particle size.

The recirculation of the reactant including transfer and re-transfer conditions has been described in connection with the device above and thus a description thereof will be omitted.

Also, the present invention provides metal precursor powders for preparing a cathode active material for a lithium secondary battery, prepared using the method described above, wherein the metal precursor powders have a particle size standard deviation of 10% or less, preferably 5% or less, more preferably 3% or less.

Other configurations and preparation methods of the cathode active material are known in the art and thus a detailed description thereof will be omitted herein.

Effects of the Invention

As described above, advantageously, the device for preparing multi-component metal hydroxides according to the present invention provides multi-component metal hydroxide having target properties because it is capable of easily controlling particle distribution and BET of the multi-component metal hydroxide, and significantly reduces a decrease in productivity in the preparation of multi-component metal hydroxides and provides multi-component metal hydroxides with increased productivity because it is capable of minimizing discharge or disposal of intermediate reactants due to the saturation of the reactor.

BRIEF DESCRIPTION OF DRAWINGS

FIG. 1 is a schematic diagram illustrating the configuration of a device for preparing multi-component metal hydroxides according to an embodiment of the present invention;

FIG. 2 is a graph showing the PSD particle size distribution for multi-component metal hydroxides prepared in Examples and Comparative Examples; and FIG. 3A is an SEM image of the multi-component metal hydroxide of Comparative Example 2, and FIG. 3B is an SEM image of the multi-component metal hydroxide of Example 3.

BEST MODE

Now, the present invention will be described in more detail with reference to the following examples. These examples should not be construed as limiting the scope of the present invention.

Example 1

Nickel sulfate, cobalt sulfate and manganese sulfate were mixed in a molar ratio of 80:10:10 and mixed with water subjected to reverse osmosis (RO water) to prepare a metal salt solution having a concentration of 2.0M.

In the preparation device as shown in FIG. 1, 200 L of RO water was fed into a 500 L reactor, the temperature was set to 60° C., and nitrogen gas was fed at a flow rate of 0.5 L/min for 30 minutes or more to create an inert atmosphere. 1 L of 25% NaOH and 5 L of 25% aqueous ammonia were fed to the reactor to adjust the $NH^{4+}$ concentration to 6,000 ppm or more and the pH to 12.0 or more, the metal salt solution was fed at about 0.3 to 0.5 L/min through the upper nozzle of the reactor, while stirring at a rate of 320 rpm, and co-precipitation was initiated.

When co-precipitation was continuously performed in the reactor, the initial $NH^{4+}$ concentration and the pH were gradually changed. 25% aqueous ammonia was added to maintain the $NH^{4+}$ concentration at 3,500 to 5,000 ppm, and an aqueous 25% NaOH solution was added thereto to maintain the pH at 11.5 to 12.2.

6 hours later, the slurry in the reactor began to be transferred to a storage tank through the overflow line in a free-fall manner. At this time, the temperature of the storage tank was maintained at 60° C., nitrogen gas was fed at a rate of 0.1 L/min, and the stirrer was rotated at a constant rate. Then, the slurry transferred to the storage tank started to be retransferred back to the reactor at a rate of 5 L/min through the transfer pump and pipe.

The transfer and re-transfer of the slurry between the reactor and the storage tank, that is, the circulation of the slurry between the reactor and the storage tank, continued until the average particle diameter of the multi-component composite metal hydroxide in the reactor reached about 10 μm.

Then, the particles of the multi-component metal slurry obtained as a result of the reaction were washed with RO water, filtered, and dried at 130° C. for 16 hours to remove moisture, to prepare a final product as a nickel-cobalt-manganese multi-component metal hydroxide powder.

Example 2

A multi-component metal powder was prepared in the same manner as in Example 1, except that the rate of re-transfer from the storage tank to the reactor was 10 L/min.

Example 3

A multi-component metal powder was prepared in the same manner as in Example 1, except that the rate of re-transfer from the storage tank to the reactor was 25 L/min.

Comparative Example 1

Nickel sulfate, cobalt sulfate and manganese sulfate were mixed in a molar ratio of 80:10:10 and mixed with water subjected to reverse osmosis (RO water) to prepare a metal salt solution having a concentration of 2.0M.

In a general batch-type preparation device, 200 L of RO water was fed into a 500 L reactor, the temperature was set to 60° C., and nitrogen gas was fed at a flow rate of 0.5 L/min for 30 minutes or more to create an inert atmosphere. 1 L of 25% NaOH and 5 L of 25% aqueous ammonia were fed to the reactor to adjust the $NH^{4+}$ concentration to 6,000 ppm or more and the pH to 12.0 or more, the metal salt solution was fed at about 0.3 to 0.5 L/min through the upper nozzle of the reactor, while stirring at a rate of 320 rpm, and co-precipitation was initiated.

When the co-precipitation was continuously performed in the reactor, the initial $NH^{4+}$ concentration and the pH were gradually changed. 25% aqueous ammonia was added to maintain the $NH^{4+}$ concentration at 3,500 to 5,000 ppm, and a 25% aqueous NaOH solution was added thereto to maintain the pH at 11.5 to 12.2.

6 hours later, the slurry in the reactor was transferred to a storage tank through the overflow line in a free-fall manner. While the reaction was performed in the reactor, some of the reaction products had to be continuously transferred to the storage tank. The particles of the multi-component metal slurry prepared as a result of the reaction for a total of 10 to 25 hours were washed with RO water, separated by filtration, and dried at 130° C. for 16 hours to remove moisture. Through this process, a nickel-cobalt-manganese multi-component metal hydroxide powder having an average particle diameter of about 10 μm was prepared.

Comparative Example 2

Nickel sulfate, cobalt sulfate and manganese sulfate were mixed in a molar ratio of 80:10:10 and mixed with water subjected to reverse osmosis (RO water) to prepare a metal salt solution having a concentration of 2.0M.

In a general CSTR-type preparation device, 400 L of RO water was fed into a 500 L reactor, the temperature was set to 60° C., and nitrogen gas was fed at a flow rate of 0.5 L/min for 30 minutes or more to create an inert atmosphere. 2.5 L of 25% NaOH and 15 L of 25% aqueous ammonia were fed to the reactor to adjust the $NH^{4+}$ concentration to 7,000 ppm or more and the pH to 12.1 or more, the metal salt solution was fed at about 0.3 to 0.5 L/min through the upper nozzle of the reactor, while stirring at a rate of 280 rpm, and co-precipitation was initiated.

When co-precipitation was continuously performed in the reactor, the initial $NH^{4+}$ concentration and the pH were gradually changed. 25% aqueous ammonia was added to maintain the $NH^{4+}$ concentration at 4,500 to 7,000 ppm, and an aqueous 25% NaOH solution was added thereto to maintain the pH at 11.7 to 12.4. As the reaction begun and the slurry was slowly filled up, the slurry in the reactor was transferred to a storage tank through the overflow line in a free-fall manner. While the reaction was performed in the reactor, some of the reactants had to be continuously transferred to the storage tank.

The reaction continued for 40 to 100 hours so that the average particle diameter of the metal slurry particles in the reactor became 10 μm. When the average particle diameter was maintained at 10 μm, a fresh storage tank was used to obtain a sample. The particles of the multi-component metal slurry collected through an overflow line were washed with RO water, separated by filtration, and dried at 130° C. for 16 hours to remove moisture. Through this process, a nickelcobalt-manganese multi-component metal hydroxide powder having an average particle diameter of about 10 μm was prepared.

Experimental Example 1

The tap density (TD), particle distribution (QD: $(D_{85}-D_{15})/(D_{85}+D_{15})$), BET surface area, and the like of the multi-component metal hydroxides prepared in Examples 1 to 3 and Comparative Examples 1 and 2, respectively, were measured and the results are shown in Table 1 below.

TABLE 1

| | Circulation rate (L/min) | TD (g/cc) | Particle distribution (QD) | BET (m²/g) |
|---|---|---|---|---|
| Example 1 | 5 | 1.90 | 0.27 | 4.34 |
| Example 2 | 10 | 1.95 | 0.23 | 7.51 |
| Example 3 | 25 | 1.82 | 0.17 | 9.19 |
| Comparative Example 1 | — | 1.92 | 0.21 | 8.73 |
| Comparative Example 2 | — | 1.89 | 0.26 | 3.89 |

As can be seen from Table 1, the particle distribution (QD) of the multi-component metal hydroxide in Examples based on the present invention becomes dense as the circulation rate of the reaction solution between the reactor and the storage tank increases.

That is, the multi-component metal hydroxides prepared in Examples of the present invention are capable of controlling the distribution of the prepared particles by controlling the circulation rate of the reaction solution and applying the circulation rate in various forms depending on the particle distribution of the target level. Based thereon, even a particle distribution similar to that of multi-component metal hydroxide prepared by a CSTR-type preparation device as in Comparative Example 2 or a general batch-type preparation device as in Comparative Example 1 can be realized by controlling the circulation rate of the reaction solution.

In addition, it can be seen that the BET surface area of the multi-component metal hydroxides of Examples increases as the circulation rate of the reaction solution increases. Therefore, the present invention is capable of easily controlling the QD and BET surface area of the multi-component metal hydroxide, which was not easy to control with the conventional batch-type or CSTR-type preparation device.

Experimental Example 2

The particle size distribution (PSD) of the multi-component metal hydroxides prepared in Examples and Comparative Examples was measured under the following conditions, and the results are shown in Table 2 and FIG. 2 below.
<Measurement Conditions>
Measuring equipment: Microtrac S3500 Extended
Circulation rate: 45%/sec
Refraction index ratio: 1.55
Solvent fed to the device: distilled water
Sample of cell: 0665
Calculation logic: ×100
Amount of sample: 0.0025 g
Dispersant fed to sample: 1 ml of 10% sodium hexametaphosphate
Solvent fed to sample: 40 ml of distilled water
Ultrasonic dispersion of sample: 40 kHz, 1 min.

TABLE 2

| Item | Circulation rate (L/min) | $D_{min}$ (um) | $D_5$ (um) | $D_{50}$ (um) | $D_{95}$ (um) | $D_{max}$ (um) |
|---|---|---|---|---|---|---|
| Example 1 | 5 | 3.11 | 5.95 | 10.12 | 21.25 | 37.00 |
| Example 2 | 10 | 6.00 | 7.12 | 10.15 | 13.88 | 22.00 |
| Example 3 | 25 | 6.00 | 7.89 | 10.09 | 12.83 | 18.50 |
| Comparative Example 1 | — | 6.00 | 7.28 | 10.11 | 13.12 | 18.50 |
| Comparative Example 2 | — | 4.24 | 6.55 | 10.01 | 20.17 | 37.00 |

As can be seen from Table 2 and FIG. 2, in the multi-component metal hydroxides prepared in Examples based on the present invention, the distribution of particles becomes uniform as the circulation rate of the reaction solution increases, and the curve on the graph becomes sharper. That is, the multi-component metal hydroxides prepared in Examples of the present invention are capable of easily achieving a target particle distribution by controlling the circulation rate of the reaction solution.

Therefore, even a particle distribution similar to that of the multi-component metal hydroxide prepared using a CSTR-type preparation device as in Comparative Example 2 or a general batch-type preparation device as in Comparative Example 1 can be implemented by adjusting the circulation rate of the reaction solution.

Experimental Example 3

SEM images of the multi-component metal hydroxides prepared in Example 3 and Comparative Example 2 were obtained and the results are shown in FIGS. 3A and 3B.

As can be seen from FIGS. 3A and 3B, the multi-component metal hydroxide prepared in Example 3 (FIG. 3B) has uniform and even particle shapes and had no fines that can be seen in the multi-component metal hydroxide prepared in Comparative Example 2 (FIG. 3A).

Although preferred embodiments of the present invention have been disclosed for illustrative purposes, those skilled in the art will appreciate that various modifications, additions, and substitutions are possible without departing from the scope and spirit of the invention as disclosed in the accompanying claims.

The invention claimed is:

1. A device for preparing multi-component metal hydroxide comprising:
   a raw material feeder configured to feed raw materials including a metal raw material, a pH adjuster and a complexing agent;
   a reactor configured to react the raw materials fed from the raw material feeder to prepare a reaction solution and grow particles of multi-component metal hydroxide contained in the reaction solution;
   a storage tank configured to store the reaction solution transferred from the reactor;
   a first duct configured to transfer the raw materials from the raw material feeder to the reactor;
   a second duct configured to transfer the reaction solution from the reactor to the storage tank;
   a third duct configured to transfer the reaction solution from the storage tank to the reactor; and
   an operation controller configured to control operations of the reactor and the storage tank to circulate the reaction solution between the reactor and the storage tank until the particles of multi-component metal hydroxide grow to a target particle size, wherein the device is configured so that as the reaction solution recirculates between the reactor and the storage tank, an intermediate reactant in the reaction solution grows into a final product, and wherein when this growth is complete, both the reactor and the storage tank contain the final product.

2. The device according to claim 1, wherein the metal raw material comprises at least one of nickel, cobalt, or manganese, the pH adjuster comprises at least one of sodium hydroxide, potassium hydroxide, or sodium carbonate, and the complexing agent comprises at least one of ammonium hydroxide, ammonium nitrate, or ammonium sulfate.

3. The device according to claim 1, wherein the operation controller controls operation of the raw material feeder to continuously feed the raw materials to the reactor until the particles of the multi-component metal hydroxide contained in the reaction solution grow to the target particle size.

4. The device according to claim 1, wherein the operation controller controls operation of the reactor to start transferring the reaction solution from the reactor to the storage tank when at least one of the following requirements is satisfied:

(i) when the particles of the multi-component metal hydroxide grow to a size corresponding to 20% or more of the target particle size; and (ii) when the filling rate of the multi-component metal hydroxide in the reactor is 65% or more by volume.

5. The device according to claim 1, wherein the operation controller controls operation of the storage tank to start retransferring the reaction solution from the storage tank to the reactor when 5% or more of an internal capacity of the storage tank is filled with the reaction solution.

6. The device according to claim 1, wherein the operation controller is set to stop the circulation of the reaction solution and the feed of the raw materials from the raw material feeder when the particles of the multi-component metal hydroxide contained in the reaction solution of the reactor and the storage tank grow to the target particle size or more.

7. The device according to claim 6, wherein the particles of the multi-component metal hydroxide contained in the reaction solution in the reactor and the storage tank have the same average particle diameter or have an average particle diameter deviation of 1% or less when the circulation of the reaction solution between the reactor and the storage tank is stopped.

8. The device according to claim 1, wherein the operation controller controls operation of the reactor and the storage tank to selectively discharge the reaction solution from the reactor and the storage tank when the multi-component metal hydroxide contained in the reaction solution in at least one of the reactor or the storage tank grows to the target particle size or more.

9. The device according to claim 8, further comprising a collector configured to receive the reaction solution discharged from at least one of the reactor or the storage tank.

10. The device according to claim 1, further comprising, in at least one of the reactor or the storage tank, a stirrer for stirring the reaction solution filled therein.

11. The device according to claim 1, further comprising, in the third duct, a solid-liquid separator configured to concentrate the reaction solution transferred from the storage tank to the reactor.

12. The device according to claim 11, wherein the solid-liquid separator increases a concentration of the multi-component metal hydroxide contained in the reaction solution by removing a part of a filtrate of the reaction solution transferred from the storage tank to the reactor.

13. The device according to claim 1, wherein the second duct connects the reactor to the storage tank such that a height difference is formed between the reactor and the storage tank, and the reaction solution of the reactor is transferred to the storage tank via the second duct based on potential energy caused by the height difference.

14. The device according to claim 1, further comprising, in the third duct, a circulation pump configured to provide a driving force for re-transferring the reaction solution stored in the storage tank to the reactor.

15. The device according to claim 1, further comprising an inert gas feeder configured to feed an inert gas to at least one of the reactor or the storage tank.

16. A method for preparing multi-component metal hydroxide using the device according to claim 1, the method comprising:

(a) feeding raw materials from a raw material feeder to a reactor via a first duct;

(b) preparing a reaction solution by reaction of the raw materials in the reactor and growing particles of multi-component metal hydroxide contained in the reaction solution;

(c) transferring a part of the reaction solution from the reactor to the storage tank under predetermined conditions;

(d) retransferring a part of the reaction solution from the storage tank to the reactor under predetermined conditions;

(e) repeating the above steps (c) and (d) to circulate the reaction solution between the reactor and the storage tank until the particles of multi-component metal hydroxide grow to a target particle size; and (f) stopping the feed of the raw materials and the circulation of the reaction solution and discharging the reaction solution from the reactor and the storage tank when the particles of multi-component metal hydroxide grow beyond the target particle size.

17. Metal precursor powders for preparing a cathode active material for a lithium secondary battery, prepared using the method according to claim 16.

18. The metal precursor powders according to claim 17, wherein the metal precursor powders have a particle size standard deviation of 10% or less.

\* \* \* \* \*